United States Patent [19]
Zeitlin

[11] Patent Number: 6,138,493
[45] Date of Patent: Oct. 31, 2000

[54] KINEMATIC ERROR TEST CALIBRATION

[76] Inventor: Alexander S. Zeitlin, 763 Hunt Club Blvd., Auburn Hills, Mich. 48326

[21] Appl. No.: 08/845,118

[22] Filed: Apr. 21, 1997

[51] Int. Cl.$^7$ ........................................................ G01P 1/07
[52] U.S. Cl. ................................ 73/1.01; 73/1.79; 73/1.84
[58] Field of Search .................................... 73/1.01, 1.79, 73/1.82, 1.84

[56] References Cited

U.S. PATENT DOCUMENTS

| | | | |
|---|---|---|---|
| 4,551,017 | 11/1985 | Mannava et al. | 73/657 X |
| 4,601,580 | 7/1986 | Halliwell | 73/657 X |
| 5,144,840 | 9/1992 | Whipple, III | 73/660 |
| 5,365,787 | 11/1994 | Hernandez et al. | 73/660 |
| 5,465,624 | 11/1995 | Tseytlin et al. | 73/660 X |

FOREIGN PATENT DOCUMENTS

| | | |
|---|---|---|
| 481763 | 10/1973 | U.S.S.R. . |
| 698373 | 9/1977 | U.S.S.R. . |

OTHER PUBLICATIONS

Technical Paper #945029, SAEC, 25th FISITA Congress, Oct. 17–21, 1994, Beijing, China, "Analysis of Gear Transmission Error", Tarutani et al.

Technical Paper #891869, SAE, SAE Trans., SAE International Off–Highway and Powerplant Congress and Exposition, Milwa, 1989, "Methods for measuring gear transmission error under load and at operating speeds", Houser.

Technical Paper #904032, I Mech E, Gearbox Noise and Vibration, Conf. 1990–5, "A review of the theory and measurement of gear transmission error", Munro.

Technical Paper #9532949, Journal of JSAE, Mar., 1995, vol. 49(3), "Measurement and analysis of engine torsional vibration", Kurisu.

Article, "Measurement of gear Transmission Error Using laser Velocimeters", Kato et al, pp. 225–229, Toyota and ACT Electronics.

Technical Paper #914856, I Mech E, 1991, vol. 205, "Practical rotary encoder accuracy limits for transmission error measurement", Smith.

Publication, Bruel & Kjaer, Denmark, Product Data, Torsional Vibration Meter–Type 2523.

Technical Paper #844008, MEP–193, I Mech E, 1984, "Some Vibratory Characteristics of Hooke's Joint Drive–Line Systems", Earles & Esat.

*Primary Examiner*—Daniel S. Larkin

[57] ABSTRACT

A calibration device is provided for use in an apparatus for measuring kinematic error in a power mechanism which includes an input shaft, an output shaft, and a kinematic error measurement device. The calibration device comprises a Hooke's joint interposed at an inclination angle between the input shaft and the output shaft and a device to measure the inclination angle.

16 Claims, 3 Drawing Sheets

KINEMATIC ERROR TEST CALIBRATION

FIELD OF THE INVENTION

This invention relates to a method of calibrating a device for checking the accuracy of power transmission mechanisms, such as calibrating a device used for checking gear pairs.

BACKGROUND OF THE INVENTION

In gear transmission designs, there is a growing demand for the apparently opposed requirements of carrying greater loads at higher speeds, with more reliability and quietness of operation. In part, these demands may be met to some extent by improved materials, better balancing, more nearly perfect machined surfaces, and more intensive attention to a myriad of design details. Such details include stringent mathematical analysis of both the kinematic and dynamic conditions of operation. An essential purpose of gear-tooth profiles is to transmit rotary motion from one shaft to another. In many cases, there is an additional requirement of uniform rotary motion. An almost infinite number of forms may be used as gear-tooth profiles. Although an involute profile is one of the most commonly used in conventional gear-tooth forms that are used to transmit power, occasions may arise when some other profile can be used to advantage. In all such mechanisms, even small deviations in rotational velocity can lead to poor machine performance, premature failure, and human discomfort caused by noise and vibrations in the working gears.

An ideal gear profile may be mathematically determined. Inevitably, surface deviations occur from the ideal profile. Such deviations tend to cause an excessive acceleration or deceleration of a driven gear in relation to a driving gear, which may in turn result in noise, vibration, and knocking. Such adverse effects may also be manifest in ideal gear profiles which are mounted with some degree of eccentricity. In general, kinematic error, or transmission error (TE), derives from instantaneous oscillations caused by production deviations of gear members from their proper theoretical parameters. Such errors arise from an actual positioning in space in relation to where a given point on the gear profile should be if no error existed. As a kinematic process, these errors produce acceleration and deceleration or torsional vibrations of the driven output shaft of a power transmission system. Another contributing factor may be the frequency with which meshing occurs between mating teeth. In some cases, such errors could be the source of dynamic torsional effects, which manifest themselves as kinematic errors.

One apparatus and method of measuring torsional vibration in a rotating shaft uses a laser doppler velocimeter (LDV) as described in U.S. Pat. No. 5,465,624, assigned to the assignee of the present application, which is incorporated herein in its entirety by reference. An LDV for use in such a system is available from the Bruel & Kjaer Company (Denmark) (Model 2523). This system allows an observer to measure torsional vibration of a rotating shaft by receiving a signal indicative of the deviation of instantaneous surface velocity from an average level.

A second LDV system was described in *The Proceedings of the International Conference on Motion and Power Transmissions* in Hiroshima, Japan on Nov. 23–26, 1991, which included a paper entitled "Measurement of Gear Transmission Error Using Laser Velocimeters", pages 225–229 ("Proceedings"). That paper discloses a gear transmission error measurement system using a laser to measure the surface speeds of objects. The system has two rotating gears having the same surface speeds. Because in "Proceedings" the surface speed is measured, shaft runouts and other eccentricities in the measurement device create errors in any measurements. Other measurement methods include Russian Reference No. 1966733, which discloses a seismic device that contacts the machine elements under observation and Russian Reference No. 698373, which discloses an optical encoder that measures kinematic errors in chains with non-integer ratios. These references are incorporated herein by reference. Other commercially available apparati for the determination of transmission errors (TE) in industrial mechanisms, such as reducers, gear boxes, and automotive axles, are available from suppliers including Ono-Sokki Company (Japan) and Gleason Works Company (U.S.A.).

The above methods and apparati measure kinematic error in rotating shafts, but the output of each may not be useful, as the magnitude of any transmission errors will be unknown until the measurement apparatus is calibrated. Known gear testers also have inherent measurement errors, which include errors input by the encoders. These errors are combined with the signal being measured. The combination of the error and the measured signal creates an output value. To separate these signals, it is necessary to determine the measurement error. This error presents a combination of systematic and stochastic components. Commercial test devices are often not directly calibrated by the manufacturer. In such instances, calibration is presumed from physical principles used in these testers. These presumptions rely upon the accuracy of key components produced by outside companies and on other unreliable methods. Where the instruments are not directly calibrated, the accuracy may be suspect, so the user of such devices may conduct various procedures and tests to confirm the accuracy of the apparatus. If the manufacturer directly calibrates the apparatus, typically such calibration is performed by the manufacturer prior to shipment of the device. An example of such calibration may include adding physical sensors to the apparatus to measure errors. These techniques are done at the manufacturer, where the apparatus is produced. However, these techniques provide additional errors and therefore each subsequent measurement with the apparatus includes the prior error. Furthermore, the apparatus is not easily verified at the customer's site, and any error that occurs after the apparatus leaves the manufacturer is incorporated into any subsequent measurements.

In *IMECHE* 1991, pages 431–436, J. D. Smith describes in "Practical Rotary Encode Accuracy Limits for Transmission Error Measurement" the error in calibration from the manufacturer and further describes the difficulty of obtaining an accurate calibration. In this article, a calculation is provided for a repetitive test which is subject to inherent residual errors in the machine.

It would be desirable to provide a method of testing a device for checking the accuracy of power transmission mechanisms, particularly a method which may be easily used to calibrate such devices in a production environment.

SUMMARY OF THE INVENTION

In accordance with the objects of this invention, a method of calibrating a device for checking the accuracy of power transmission mechanisms is described. A calibration device for use in an apparatus for measuring kinematic error in a power mechanism which includes an input shaft, an output shaft, and a kinematic error measurement device. The calibration device comprises a Hooke's joint interposed at an inclination angle between the input shaft and the output shaft and a device to measure the inclination angle.

Advantages of the present method include the provision of an accurate and economical means for calibrating such a device at the manufacturer and determining the accuracy of the device after delivery and use by a customer.

DETAILED DESCRIPTION OF THE PREFERRED EMBODIMENTS

Figure 1:
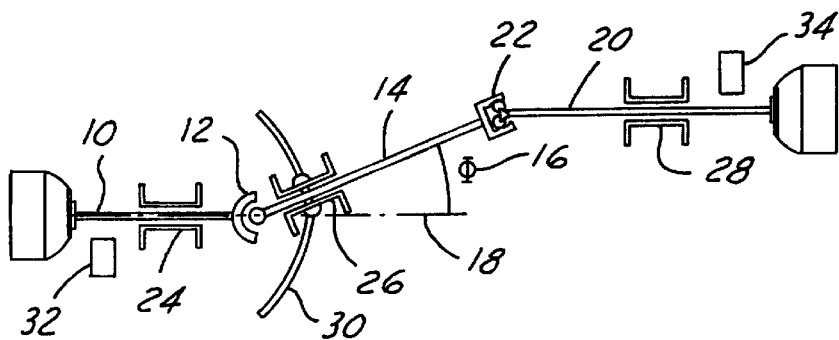
FIG. 1 is a schematic view of a gear roll tester with parallel axes using a calibration method according to the present invention.

As described in U.S. Pat. 5,465,624 to Tseytlin et al ('624 patent), assigned to the assignee of the present invention and which is incorporated herein by reference, an apparatus is provided to measure kinematic error in a gear transmission system. The '624 device includes first and second means for generating and processing reflected laser energy, such as torsional vibration meters or laser doppler velocimeters (LDV)s, which are aligned with the final shafts of a controlled mechanism or machine. The final shafts include an input (driving) element which engages an output (driven) element. One LDV is aligned with the driving element, and the other LDV is aligned with the driven element. The '624 apparatus measures deviation in angular velocity of the mechanism's instantaneous shaft angular rotation speed to measure kinematic error. The above apparatus is presented as one means by which the present invention to calibrate such a device may be used, and the present invention is not limited to use with such a device.

Testing machines for gear accuracy measurement typically consist of two spindles for the rotation of gear members. One spindle is drivingly connected to an electrical drive that provides rotation of an input shaft which drivably rotates a pair of gears. A second spindle is driven by the gears. The second spindle may also be connected to an electrical drive, hydraulic, or another type of brakes to produce a torque load. The main spindle function is to reproduce the working mounting configuration for testing gear sets.

The input shaft and output shaft are arranged to accommodate parallel axis gears, gears with perpendicular orientation, or gears having any inclination therebetween. As is known to one skilled in the art, two types of testers or two configurations of the same machine may be used for the orientations described above for gear accuracy checking. Often the same universal gear tester machine may have a rotating swinging base, which makes it possible to reconfigure the tester to any feasible angle between spindles.

On the test machines described above, the mechanical power from an input spindle is applied to a testing gear pair through arbors and other mechanical rotational fixtures that are not originally provided as part of the tester's package. The fixtures transfer rotational motion from tester spindles to the gear pair. These fixtures and arbors are of varying design and quality level to meet the specific requirements of each individual gear pair. Thus, when calibrating a fixture, the calibration must also account for these fixtures.

A calibration device according to the present invention provides an offset of parallel axis spindles in one configuration, and in a second application, an offset between the perpendicular axes, thus requiring the use of additional elements to transfer rotation from the input spindle to the output spindle. Normally this transfer is provided using a constant velocity even when it creates a bias between the driving spindle and axis of the transfer element, typically using automotive constant velocity (CV) joints. The present invention includes CV joint(s) in the same kinematic chain with a Hooke's joint to achieve the goal of producing rotational motion with a predictable kinematic error through the Hooke's joint.

Thus the present invention introduces a known theoretical transmission error (TE) into a driveline mounted on a measurement device. In a preferred embodiment as shown in FIG. 1, in a test device for a single flank roll tester for a single pair of cylindrical gears, an input shaft 10 is drivably connected to a Hooke's joint 12. Hooke's joints are well known and not further described here. The Hooke's joint 12 is drivably connected to an intermediate shaft 14, disposed at an inclination angle 16 $\phi$ relative to the axis of rotation 18 of the input shaft 10. The intermediate shaft 14 is connected to an output shaft 20 through a universal joint 22. Bearings 24, 26, 28 rotatably support the shafts 10, 14, 20. A means 30 for measuring the inclination angle 16 $\phi$ is provided. The inclination angle 16 is measured using a high accuracy calibrated angle measurement scale as is known in the art.

Figure 5:
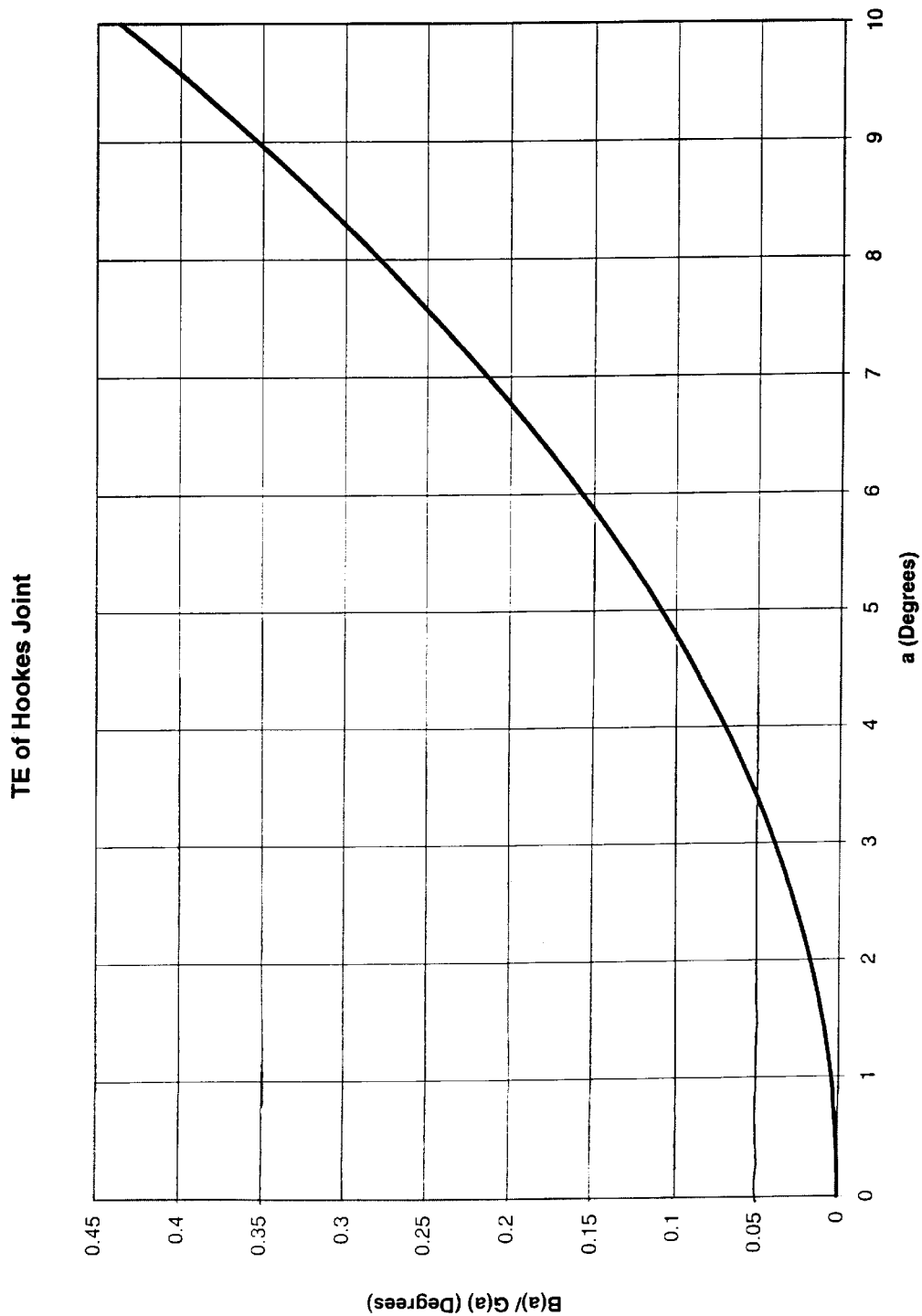
FIGS. 5 and 6 graphically represent the induced TE at a given angle for a device using the present invention.

The Hooke's joint 12 produces a known theoretical TE, depending on its parametric configuration. By inclining the intermediate shaft 14 at a first inclination angle 16 to the input shaft 10, the second harmonic of rotational non-uniformity of the intermediate shaft 14 due to the Hooke's joint 12 is measurable, even if the driving rotation is absolutely uniform. The detailed description of the rotational error amplitude versus inclination angle 16 is described below and illustrated in FIGS. 5 and 6. The TE is measured using sensors 32, 34. A preferred sensor arrangement and method of measuring the TE is described in the '624 patent using Laser Doppler Velocimeters (LDV) and is therefore not described further herein. Alternative measurement methods are well known in the art and are also not described further.

Figure 6:
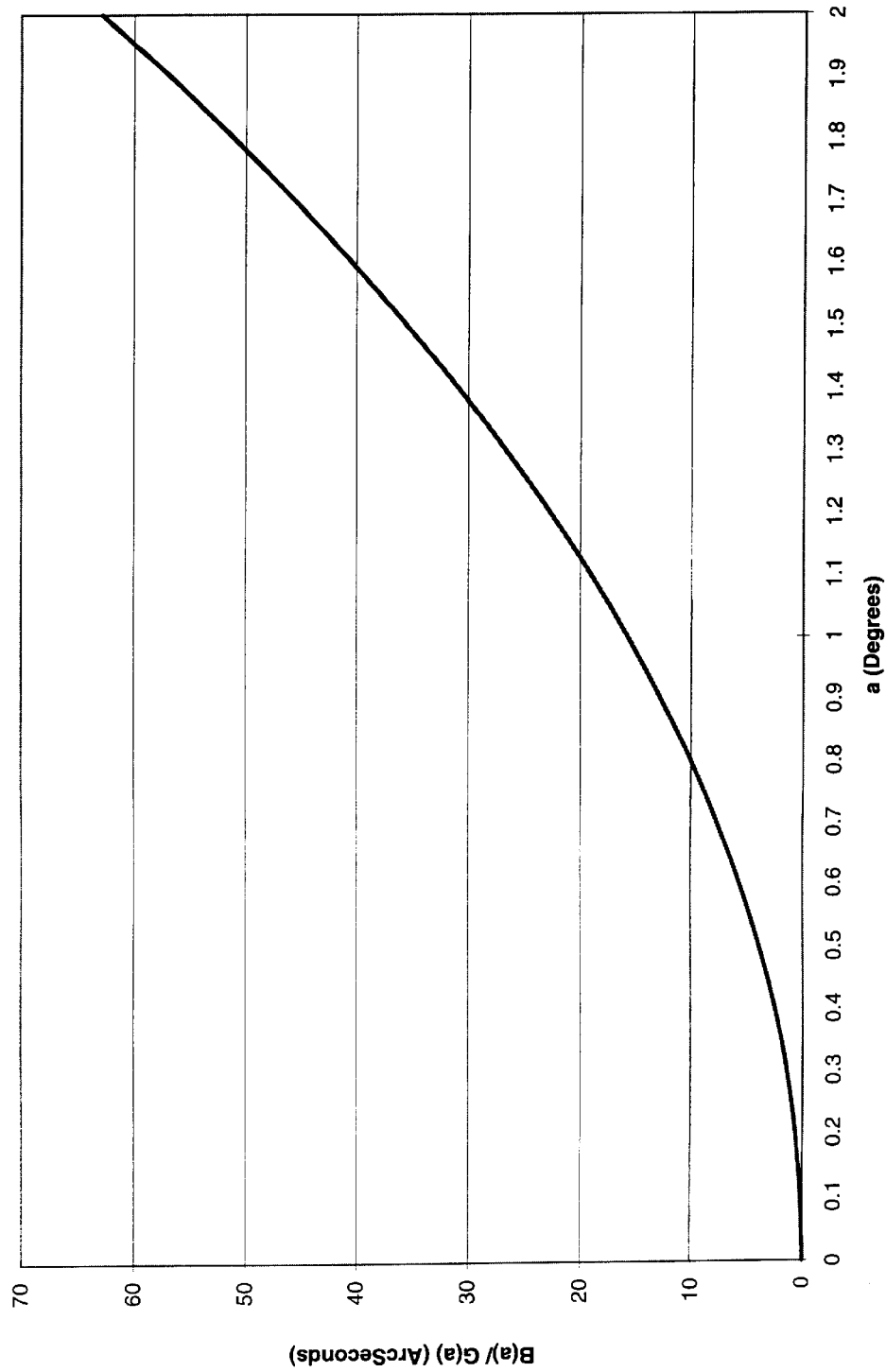

A second kinematic error with a distinctive frequency (the second harmonic of rotational period) may be obtained by changing the inclination angle 16 of the Hooke's joint 12. The ratio of this calibrating operation is preferably set-up in a 1:1 ratio and inclination angle 16 adjustments are set in the range of 0–2 degrees in order to produce the range of calibration of approximately 50 ArcSeconds as shown in FIG. 6. Such a small angle 16 adjustment requires the precision geometrical performance of Hooke's joint components and a high accuracy calibrated angle measurement scale 30 for correct measurement of the inclination angle 16 (*a*).

The preferred method of calibration includes the inclination angle 16 values within the above range to receive several points with predicted numbers of kinematic errors. Preferably, as viewed in FIGS. 5 and 6, the inclination angles 16 are selected to produce a proportional function of the tester readouts as a function of inclination angle 16. This method permits the measurement of non-linearity and amplitude range. It is also meaningful that in the spectrum of FFT of the tester's signals a component that relates to the calibrating device has a distinctive frequency, which is a second harmonic of the spindle rotational period.

The amplitude of torsional vibrations of the mechanism can be controlled by varying the inclination angle 16 of the Hooke's joint 12. By comparing the theoretically predicted TE of the Hooke's joint 16 to the actual error that is measured, the proper tester calibration is determined. The rotational TE of the Hooke's joint 12 is sensitive to error in the inclination angle 16. For example, as illustrated in FIG. 6, introducing a ten degree inclination angle 16 causes a TE equal to 1,571 ArcSeconds, while an inclination angle of nine degrees causes a TE equal to 1,272 ArcSeconds (or a 19% error if a ten degree angle is measured incorrectly as nine degrees). Furthermore, the majority of tooth measurement testers which would be used for checking TE's measure amplitudes of not more than hundreds seconds of arc. Therefore the maximum tolerance for inclination angle preferably does not exceed several degrees when using such a device.

Figure 2:
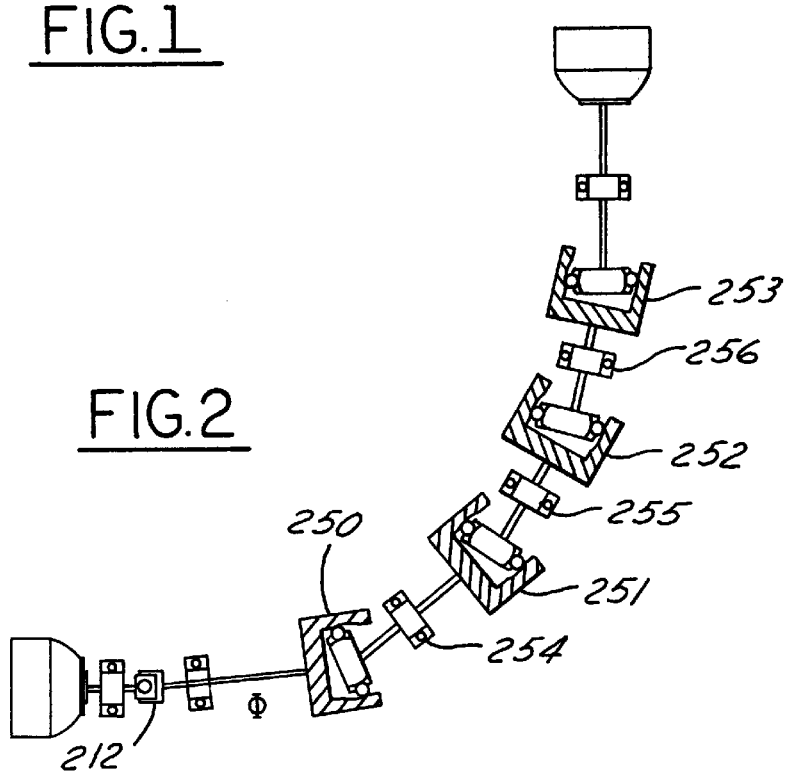
FIG. 2 is a schematic view of a gear roll tester with perpendicular axes using a calibration method according to the present invention.

As shown in FIG. 2, the apparatus described in FIG. 1 for measuring a parallel shaft tester may be modified for a perpendicular orientation as illustrated in FIG. 2. A Hooke's joint 212 is provided in the apparatus. Several additional universal joints 250–253 and bearings 254–256 may be required to provide proper drive transmission.

Figure 3:
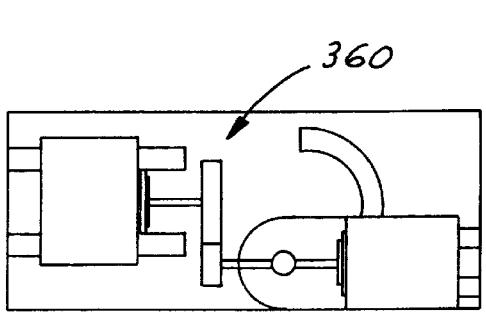
FIGS. 3 and 4 are schematic views of the gear roll testers shown in FIGS. 1 and 2, respectively, having gears mounted therein.
Figure 4:
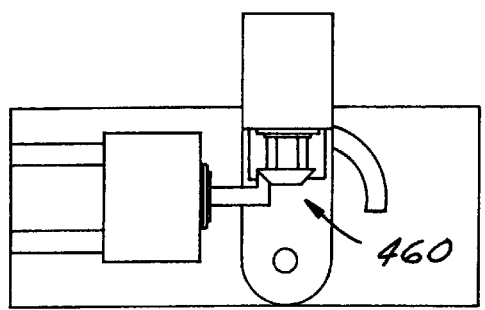

FIGS. 3 and 4 illustrate test devices shown in FIGS. 1 and 2 having a single pair of gears 360, 460 installed, respectively, in place of the Hooke's joint described above.

Equations used to determine the transmission error (TE) as a function of inclination angle between the shafts using the Hooke's joint are calculated as follows:

$$B(a) = (a \tan (\cos (a*\Pi/180)^{-\frac{1}{2}}) - a \tan ((\cos (a*\Pi/180))^{1/2}))*180/\Pi$$

Where:

a is the inclination angle (in degrees),

B(a) is the amplitude of the second harmonic of rotational frequency generated by the Hooke's joint as a function of the inclination (in degrees)

Yielding B(0)=0 and B(10)=0.439 degrees

The above calculations may be approximated using the following relationship:

$$G(a) = (a*\Pi/180)^2/4 * 180/\Pi$$

Where:

G(a) is an approximated amplitude of the second harmonic

Yielding G(0)=0 and G(10)=0.436 degrees

The above formulae are modified to calculate in ArcSeconds:

$$B1(a) = (a \tan (\cos (a*\Pi/180)^{-\frac{1}{2}} - a \tan ((\cos (a*\Pi/180))^{1/2}))*180/\Pi*3600$$

Where:

B1(a) is the amplitude of the second harmonic (in ArcSeconds)

Yielding B1(0)=0 and B1(10)=1579 ArcSeconds; and $$G1(a) = (a*\Pi/180)^2/4 * 180/\Pi * 3600$$

Where:

G1 (a) is the approximated amplitude of the second harmonic (in ArcSeconds)

Yielding G1(0)=0 and G1(10)=1571 ArcSeconds.

A further benefit of the present invention includes the ability to separate the measured output value into tester error and a measured signal. This separation is performed by obtaining further measurements and calculating the portion of the signal attributable to the tester error. The tester's errors have a complex character, thus enabling this determination of the tester's errors. It is presumed that the tester's errors include individual errors of its encoders. To measure an encoder error, the procedure described above to measure TE is run at a first starting phase angle. The TE measurement is then repeated using a different starting phase angle. The results of the two runs are averaged. The average between measurements with zero degree starting phase and the one with 180 degrees starting phase includes a measurement of all main harmonics of errors generated by the encoder whose starting phase had been changed. The above encoder error measurement procedure is repeated to determine the individual error of any additional encoders. These errors include encoder errors as well as the errors from mounting the encoders on the tester's shafts. Thus, the property of individual units of a tester may be established using the methods described above.

It is to be understood that the specific mechanisms and techniques which have been described are merely illustrative of application of the principles of the present invention. Numerous modifications may be made to the method and apparatus described herein without departing from the true spirit and scope of the invention.

What is claimed is:

1. A calibration device for use in an apparatus for measuring kinematic error in a power mechanism which includes an input shaft, an output shaft, and a kinematic error measurement device, the calibration device comprising:

a Hooke's joint interposed at an inclination angle between the input shaft and the output shaft;

a device to measure the inclination angle; and an angular torsion vibration meter for use as laser Doppler velocimeters on each of the input shaft and output shaft for measuring the kinematic error as a transmission error.

2. A calibration device according to claim 1 wherein the input shaft and output shaft are arranged in a parallel manner.

3. A calibration device according to claim 1 wherein the input shaft and output shaft are arranged in a perpendicular manner.

4. A calibration device according to claim 1 further comprising an encoder error detector.

5. A calibration device for use in an apparatus for measuring kinematic error in a power mechanism which includes an input shaft, an intermediate shaft, an output shaft, and a kinematic error measurement device, the calibration device comprising:

a Hooke's joint interposed at an inclination angle between the input shaft and the output shaft;

means for measuring the kinematic error;

means for adjusting the inclination angle;

means to measure the inclination angles; and means to determine a second harmonic of rotational non-uniformity of the intermediate shaft.

6. A calibration device according to claim 5, further comprising means for approximating the amplitude of the second harmonic and means for comparing a first amplitude at a first inclination angle to a second amplitude at a second inclination angle.

7. A calibration device according to claim 6, further comprising a means for separating the measured kinematic error into tester error and a measured kinematic error.

8. A calibration device according to claim 7, further comprising a universal joint drivably connected between the input shaft and the output shaft.

9. A calibration device according to claim 8, wherein the Hooke's joint is interposed between the input shaft and the intermediate shaft and the universal joint is interposed between the intermediate shaft and the output shaft.

10. A calibration device according to claim 9, wherein the kinematic error is measured using an angular torsion vibration meter for use as laser Doppler velocimeters on each of the input shaft and the output shaft.

11. A calibration device according to claim 10, further comprising an encoder error detector.

12. A method of calibrating an apparatus for measuring kinematic error in a power mechanism which includes an input shaft, an output shaft, and a kinematic error measurement device, the calibration comprising:

installing a Hooke's joint at an inclination angle between the input shaft and the output shaft;

measuring the inclination angle; and measuring a transmission error as a function of the inclination angle.

13. A calibration method according to claim 12 wherein the transmission error is measured using an angular torsion vibration meter for use as laser Doppler velocimeters on each of the input shaft and the output shaft.

14. A calibration method according to claim 13 further comprising measuring an encoder error and removing the encoder error from the transmission error.

15. A calibration method according to claim 14 wherein the encoder error is measured by measuring a first transmission error at a first starting phase angle and a second transmission error at a second phase angle and calculating the average thereof.

16. A calibration method according to claim 15 wherein the phase angles are substantially 180 degrees apart.

* * * * *